Patented Aug. 26, 1947

2,426,577

UNITED STATES PATENT OFFICE 2,426,577

OIL SOLUBLE COLORS OF THE ANTHRAQUINONE SERIES

Mario Scalera, Somerville, and William B. Hardy, Bound Brook, N. J., assignors to American Cyanamid Company, New York, N. Y., a corporation of Maine No Drawing. Application October 12, 1945, Serial No. 622,096

9 Claims. (Cl. 260—378)

This invention refers to new, oil-soluble colors of the anthraquinone series, and to a process for preparing them.

Amino derivatives of anthraquinone, in particular alpha amino anthraquinones, are brightly colored, and possess great tinctorial intensity. Depending on the number and position of the amino groups, shades from orange through red to green are obtainable with them. These products, however, like most anthraquinone derivatives, show only little or no solubility in organic solvents at low temperature, and are not suited for coloring oils, gasolines and other organic solvents, particularly in uses where high solubilities are required.

The solubility of the amino anthraquinones is enhanced if the amino groups are alkylated. This procedure, however, results in a satisfactory solubility only in those cases where at least two amino groups para to each other are present. These products are blue or green, and such products are known as valuable oil or gasoline colors. It has not been possible heretofore, however, to prepare colors with equal solubility characteristics in the red to violet range.

We have found that if alkyl groups are introduced in the anthraquinone nucleus itself, as well as in the amino groups, the solubility of the resulting products is far greater than one would have expected. Thus, while 1-amyl amino anthraquinone is relatively little soluble in organic solvents, such as high boiling paraffin oils, the 1-amyl amino-2-methyl AQ is soluble in these solvents to the extent of 10 to 15% by weight. The same relationship holds between 1:5-dialkylamino anthraquinone on the one hand, and 1:5-dialkylamino-2-methyl anthraquinone on the other. It is surprising that in a heavy molecule such as the amino anthraquinones a small group like the methyl should have such major solubilizing influence.

These very high solubilities are of great technical importance. They are needed not only to produce very intense shades in oils, waxes, etc., but are also extremely desirable when paler shades are desired, because they permit the preparation of concentrated "master blends" which can then be used to incorporate the color smoothly in large volumes of the liquid to be colored. Heretofore, this was not possible for red and violet shades, for which colors of sufficiently high solubility were not available.

These colors may be produced by various means. For instance, the alkyl anthraquinone may be chlorinated or nitrated, and the negative group—halogen or nitro—be replaced with an alkyl amine. Our preferred procedure reacts the alpha nitro alkyl anthraquinones with an alkyl amine in an aromatic hydrocarbon. This procedure has the advantage that the starting materials are easily and inexpensively prepared on a large scale; the reaction with the amine proceeds smoothly and in quantitative yields; and the product of reaction is easily isolated in the pure state by steam distillation of the solvent and excess of amine. Thus, the entire procedure is eminently suited for economic large scale operation.

A wide range of alkyl amines may be used. The two lowest amines, methyl and ethyl amines, while included, are less satisfactory as the solubility, while adequate for some purposes, is distinctly inferior to that which is obtainable with alkyl amines of greater chain length. On the other hand, if the chain length is excessive, such as, for example, in fatty amines of the nature of hexadecyl amine, the tinctorial strength begins to drop off and there is no gain in solubility. Therefore, we prefer not to use amines having any large content of amines having 16 or more carbon atoms. The range of amines from 3 to 6 carbon atoms give the best results, the solubility is adequate and tinctorial strength is high. Therefore, compounds having alkyl groups on the amine from 3 to 6 carbon atoms are preferred.

Of the alkyl amino anthraquinones, the most important one is 2-methyl anthraquinone, which is readily available commercially by the ring closure of para toluyl benzoic acid, and is very smoothly nitrated to 1-nitro-2-methyl, or to 1:5 and 1:8-dinitro-2-methyl anthraquinone. However, other beta alkyl anthraquinones, such as 2-ethyl anthraquinone, 2-propyl anthraquinone, 2-butyl anthraquinone can be used, and they even offer a slight advantage in solubility.

Anthraquinones having long alkyl side chains may be used but they do not offer any advantage. Therefore, while they are included broadly in the scope of the invention, we prefer beta alkyl anthraquinones in which the alkyl group has from 1 to 4 carbon atoms.

It is not necessary to use a pure alkyl amine; in fact, it is often an advantage to use mixtures of various isomeric or homologous alkyl amines. Such mixtures give products of enhanced solubility, without dulling the shade. Thus, the product of reaction from a commercial mixture of monoamyl amines on 1-nitro-2-methyl anthraquinone is considerably more soluble than the dye obtained from pure normal amyl amine.

The reaction is best carried out in aromatic solvents, such as benzene, toluene, xylene, monochlorobenzene, dichlorobenzene, etc. The chlorinated benzenes are particularly suited because of their good solvent action on the nitro alkyl anthraquinones. The reaction proceeds readily at temperatures of 80° to 120° C., and no superatmospheric pressure is required.

The invention is illustrated by the following examples, in which the parts are by weight.

*Example 1*

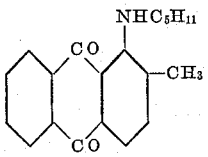

20 parts of 1-nitro-2-methylanthraquinone and 26 parts of amylamines (mixed isomers) are charged into a vessel containing 90 parts of orthodichlorobenzene. The mixture is heated under reflux with stirring for 8–10 hours. The solution gradually assumes a deep red color and practically all of the solid dissolves.

The solvent and excess amylamine are removed by steam distillation. The residue is cooled to 35–40° C., and 160 parts of carbon tetrachloride are added and after stirring for a short time, the mixture is filtered. The organic layer in the filtrate is separated and the carbon tetrachloride is removed from the dye by distillation. The last traces of solvent may be removed in vacuo, or by heating the oil in pans. The product is a deep red liquid or buttery solid readily soluble in mineral oil. The yield is practically quantitative.

*Example 2*

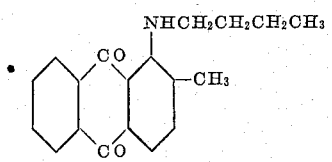

80.1 parts of 1-nitro-2-methylanthraquinone and 109.5 parts of n-butylamine and 300 parts of orthodichlorobenzene are charged into a reaction vessel and the mixture is heated under reflux with stirring for 16 hours. The mixture is steam distilled free of orthodichlorobenzene and excess butylamine, cooled, filtered, and washed well with water.

The resulting product, a low-melting solid, is a red dye soluble in organic solvents.

*Example 3*

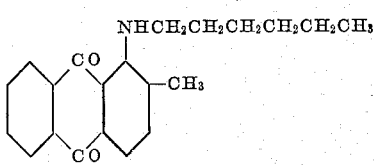

20 parts of 1-nitro-2-methylanthraquinone and 30.3 parts of n-hexylamine are charged into a vessel containing 52 parts of xylene. The slurry is heated under reflux with good stirring for 16 hours.

The resulting red solution is steam distilled until free of solvent and excess amine. The residual red solid is taken up in 160 parts of carbon tetrachloride and the solution is clarified. The solvent is removed by distillation to give a bright red solid soluble in solvents of the paraffin hydrocarbon type.

*Example 4*

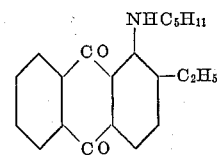

5 parts of 1-nitro-2-ethyl anthraquinone, and 6.2 parts of a commercial mixture of isomeric mono-amylamines, are placed in 19.5 parts of orthodichlorobenzene and the mixture is heated under reflux with stirring for 16 hours. The solvent and excess amine are removed by steam distillation. The residual oil is taken up in 40 parts of carbon tetrachloride, the mixture is filtered and the layers are separated. The carbon tetrachloride is removed from the dye by distillation. The resulting product is a viscous red liquid readily soluble in mineral oil.

*Example 5*

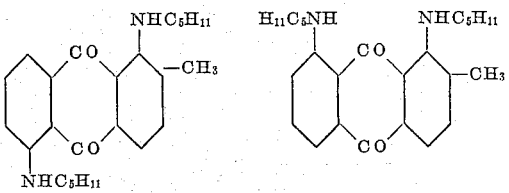

20 parts of the mixture of 1,5 and 1,8-dinitro-2-methylanthraquinone (obtainable by the dinitration of 2-methylanthraquinone), and 42 parts of a commercial mixture of mono-amylamines are charged into 104 parts of orthodichlorobenzene. The mixture is heated under reflux with stirring for 3 hours. The mixture is then steam distilled. The residual red-violet oil is taken up in 160 parts of carbon tetrachloride. The mixture is clarified and the layers in the filtrate are separated. The carbon tetrachloride is removed by distillation. The product is a red oil, giving a blue-red to violet solution in mineral oil and other organic solvents.

We claim:
1. 2-methyl-1-amylamino anthraquinone.
2. A mixture of the isomeric 2-methyl-1,5-di-(amyl amino) and 2-methyl-1,8-di-(amylamino) anthraquinone.
3. 2-alkyl-1-alkylaminoanthraquinones and mixtures thereof having the following formula

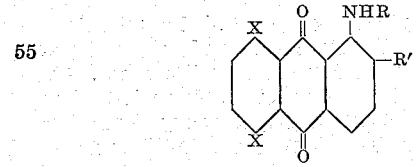

in which R is an alkyl group containing from 3 to 6 carbon atoms, R' is an alkyl group containing less than 5 carbon atoms, and X is selected from the group consisting of —H and —NHR, at least one X being hydrogen.

4. 2-methyl-1-alkylamino anthraquinones and mixtures thereof having the following formula

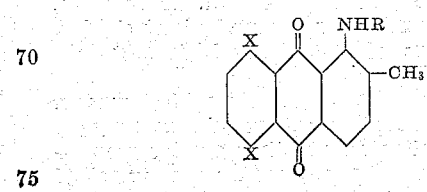

in which R is an alkyl group containing from 3 to 6 carbon atoms, and X is selected from the group consisting of —H and —NHR, at least one X being hydrogen.

5. A process of preparing 2-alkyl-1-alkylaminoanthraquinones and mixtures thereof having the following formula

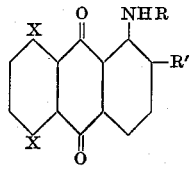

in which R is an alkyl group containing from 3 to 6 carbon atoms, R' is an alkyl group containing less than 5 carbon atoms, and X is selected from the group consisting of —H and —NHR, at least one X being hydrogen, which comprises reacting the corresponding 1-nitro-2-alkylanthraquinone with the corresponding alkylamine in an aromatic solvent selected from the group consisting of hydrocarbons and chlorinated hydrocarbons of the benzene series.

6. A process of preparing 2-methyl-1-alkylaminoanthraquinones having the formula

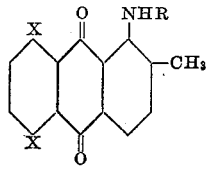

in which R is an alkyl group containing from 3 to 6 carbon atoms, and X is selected from the group consisting of —H and —NHR, at least one X being hydrogen, which comprises reacting the corresponding 1-nitro-2-methylanthraquinone with the corresponding alkylamine in an aromatic solvent selected from the group consisting of hydrocarbons and chlorinated hydrocarbons of the benzene series.

7. A process of preparing a mixture of the isomeric 1,5-di-(alkylamino)-2-methyl- and 1,8-di-(alkylamino)-2-methylanthraquinones having the following formula

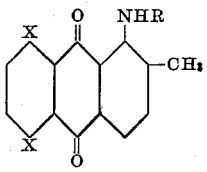

in which R is an alkyl group containing from 3 to 6 carbon atoms, and X is selected from the group consisting of —H and —NHR, at least one X being hydrogen, which comprises reacting a mixture of 1,5 and 1,8 dinitro 2 methylanthraquinone with the corresponding alkylamine in an aromatic solvent selected from the group consisting of hydrocarbons and chlorinated hydrocarbons of the benzene series.

8. A process according to claim 6 in which the alkylamine is an amylamine.

9. A process according to claim 7 in which the alkylamine is an amylamine.

MARIO SCALERA.
WILLIAM B. HARDY.

REFERENCES CITED

The following references are of record in the file of this patent:

UNITED STATES PATENTS

| Number | Name | Date |
|---|---|---|
| 2,205,191 | Flaks | June 18, 1940 |

FOREIGN PATENTS

| Number | Country | Date |
|---|---|---|
| 144,634 | Germany | Sept. 1, 1903 |